United States Patent
Wu

(10) Patent No.: US 7,448,053 B2
(45) Date of Patent: Nov. 4, 2008

(54) NOISE REDUCING OPTICAL DISC DRIVE

(75) Inventor: Jen-Chen Wu, Yunlin (TW)

(73) Assignee: Quanta Storage Inc., Tao Yuan Shien (TW)

( * ) Notice: Subject to any disclaimer, the term of this patent is extended or adjusted under 35 U.S.C. 154(b) by 527 days.

(21) Appl. No.: 11/153,613

(22) Filed: Jun. 16, 2005

(65) Prior Publication Data

US 2006/0288356 A1 Dec. 21, 2006

(51) Int. Cl.
*G11B 33/08* (2006.01)
*G11B 17/04* (2006.01)

(52) U.S. Cl. .................. 720/651; 720/611

(58) Field of Classification Search ............. 720/603, 720/611, 613, 648, 649, 651
See application file for complete search history.

(56) References Cited

U.S. PATENT DOCUMENTS

| | | | |
|---|---|---|---|
| 6,317,402 B1* | 11/2001 | Huang et al. ............... 720/603 |
| 6,392,976 B1* | 5/2002 | Lin ............................ 720/611 |
| 6,826,768 B2* | 11/2004 | Wu et al. .................... 720/651 |
| 6,961,947 B2* | 11/2005 | Chuang et al. ............. 720/611 |
| 2003/0133389 A1* | 7/2003 | Wang ........................ 369/75.2 |
| 2003/0185131 A1* | 10/2003 | Choi ......................... 369/75.2 |
| 2004/0042371 A1* | 3/2004 | Lee ............................ 369/75.2 |
| 2004/0066727 A1* | 4/2004 | Wu et al. ................... 369/75.2 |
| 2005/0015782 A1* | 1/2005 | Wang ........................ 720/603 |
| 2005/0039198 A1* | 2/2005 | You ........................... 720/603 |
| 2007/0079312 A1* | 4/2007 | Isoshima et al. ........... 720/648 |

FOREIGN PATENT DOCUMENTS

| JP | 10177755 A | * | 6/1998 |
| JP | 2001052405 A | * | 2/2001 |
| JP | 2003272368 A | * | 9/2003 |

* cited by examiner

*Primary Examiner*—Brian E Miller
(74) *Attorney, Agent, or Firm*—Birch, Stewart, Kolasch & Birch, LLP

(57) ABSTRACT

An optical disc drive including an optical disc drive body and a tray is provided. The tray is movably disposed on the optical disc drive body. The tray has a side wall. The side wall has a through hole.

11 Claims, 5 Drawing Sheets

NOISE REDUCING OPTICAL DISC DRIVE

This application incorporates by reference Taiwanese application Serial No. 93103679, filed Feb. 16, 2004.

BACKGROUND OF THE INVENTION

1. Field of the Invention

The invention relates in general to an optical disc drive, and more particularly to a noise reducing optical disc drive.

2. Description of the Related Art

In response to the explosive growth in the volume of information, most multi-media products are issued in the form of optical discs. In recent years, consumptive optical discs also experience a stable increase. Nowadays, almost every computer has an optical disc drive. Optical disc drives indeed play a very important role in terms of multi-media products.

An optical disc drive uses an optical pick-up head to retrieve an optical disc which is carried by a tray to be loaded into the optical disc drive and rotates therein. A high level optical disc drive is normally capable of driving the optical disc to rotate at a rotation rate over 10,000 rpm. Since the optical disc rotates at a high speed, a strong airflow is generated at the vicinity of the rotating optical disc.

Such a strong airflow would easily cause the tray carrying the optical disc to vibrate, hence causing the optical disc to wobble and eventually resulting in an unstable wind shear. The wind shear would further intensify the vibration of the optical disc, generate noise due to the high speed rotation of the optical disc, and make it even more difficult for the optical pick-up head to retrieve the optical disc.

Referring to FIG. 1, a diagram of a conventional optical disc drive is shown. The optical disc drive 100 includes a base 102, a lower cover 104, an upper cover 106, a face panel 108, a door panel 110, a tray body 112 and an acoustic component 114.

The door panel 110 and the tray body 112 are coupled and assembled to form a tray. The base 102, the lower cover 104, the upper cover 106 and the face panel 108 are coupled and assembled together to form an optical disc drive body. The tray is capable of entering and leaving the optical disc drive body to be disposed on the optical disc drive body. The tray for carrying optical disc 116 loads the optical disc 116 into the optical disc drive body for the optical disc drive body to retrieve.

As shown in the above diagram, in order to reduce the noise generated by the optical disc drive 100 due to the high speed rotation of the optical disc 116, an acoustic component 114 is attached to the lower cover 104 of the optical disc drive body to reduce the noise of the conventional optical disc drive 100.

Normally, the conventional optical disc drive 100 uses high polymer foaming material as the material for the acoustic component 114. The high polymer foaming material can be rubber foaming material or PU foaming material.

Since an additional acoustic component 114 needs to be attached to the conventional optical disc drive 100 to reduce the noise generated by the optical disc drive 100 due to the high speed rotation of the optical disc 116, the material cost, assembling cost and structural complexity of the acoustic component 114 would inevitably increase.

SUMMARY OF THE INVENTION

It is therefore an object of the invention to provide an optical disc drive capable of reducing the noise generated due to the high speed rotation of the optical disc without increasing any manufacturing cost.

According to the above object, the invention provides an optical disc drive including an optical disc drive body and a tray. The tray is movably disposed on the optical disc drive body. The tray includes a first side wall and a second side wall. The first side wall is disposed on a first side of the tray and has at least a first through hole. The second side wall is disposed on a second side of the tray. The second side opposes to the first side. Moreover, the second side wall has at least a second through hole corresponding to the first through hole.

In the optical disc drive according to the invention, the tray can further have a front portion, the first through hole and the second through hole are respectively positioned on the first side wall and the second side wall both of which are near the front portion. Beside, the tray can also have a middle portion, the first through hole and the second through hole are respectively positioned on the first side wall and the second side wall both of which are near the middle portion. Moreover, the tray can further have a back portion, the first through hole and the second through hole are respectively positioned on the first side wall and the second side wall both of which are near the back portion.

Other objects, features, and advantages of the invention will become apparent from the following detailed description of the preferred but non-limiting embodiments. The following description is made with reference to the accompanying drawings. Anyone who is skilled in related technology would be able to understand and implement the technology accordingly.

DETAILED DESCRIPTION OF THE INVENTION

The invention is exemplified by an embodiment. However, the scope of protection of the invention is not to be limited to the embodiment. The embodiment is merely an optical disc drive under the spirit of the invention. The characteristics and features of the invention are elaborated below.

Figure 1:
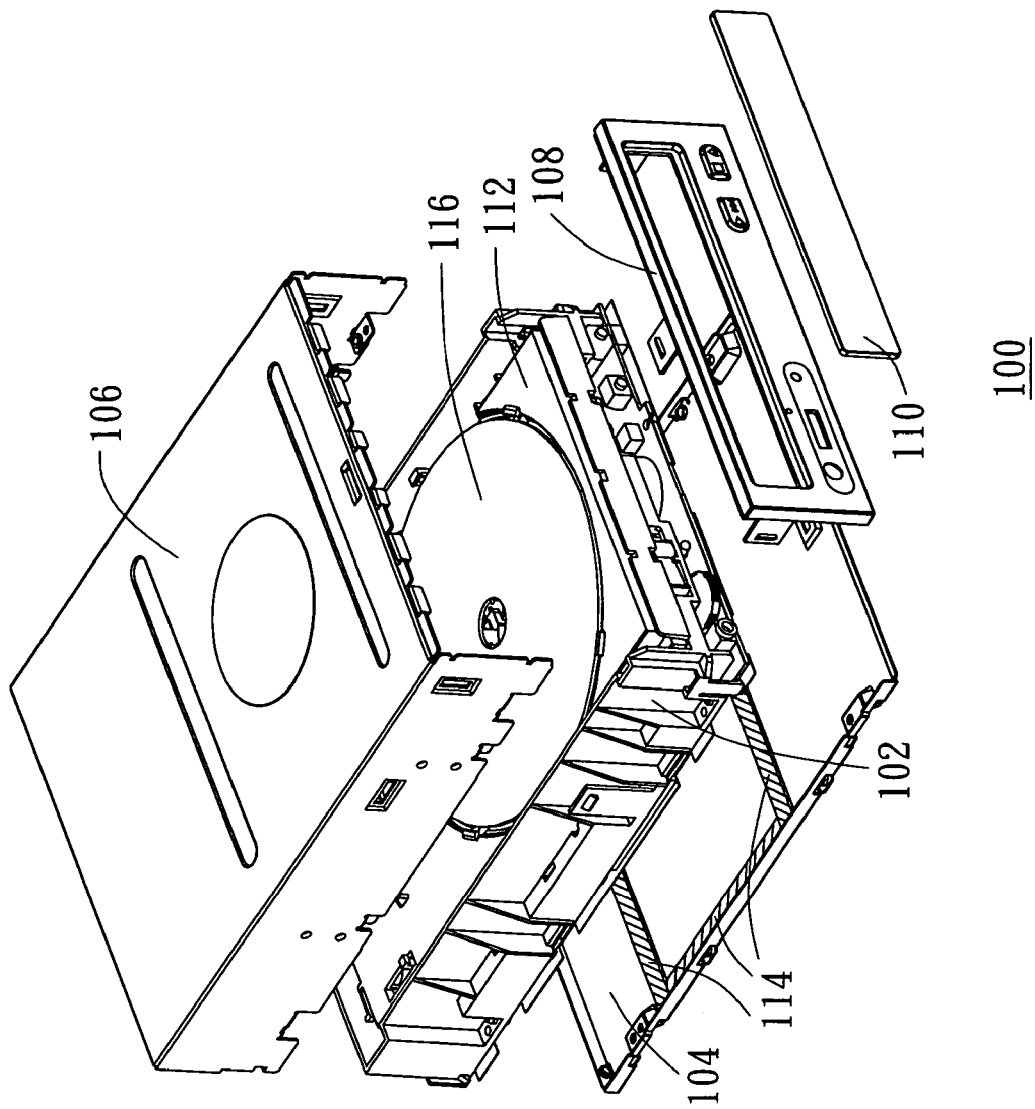
FIG. 1 (Prior Art) is a diagram of a conventional optical disc drive.
Figure 2:
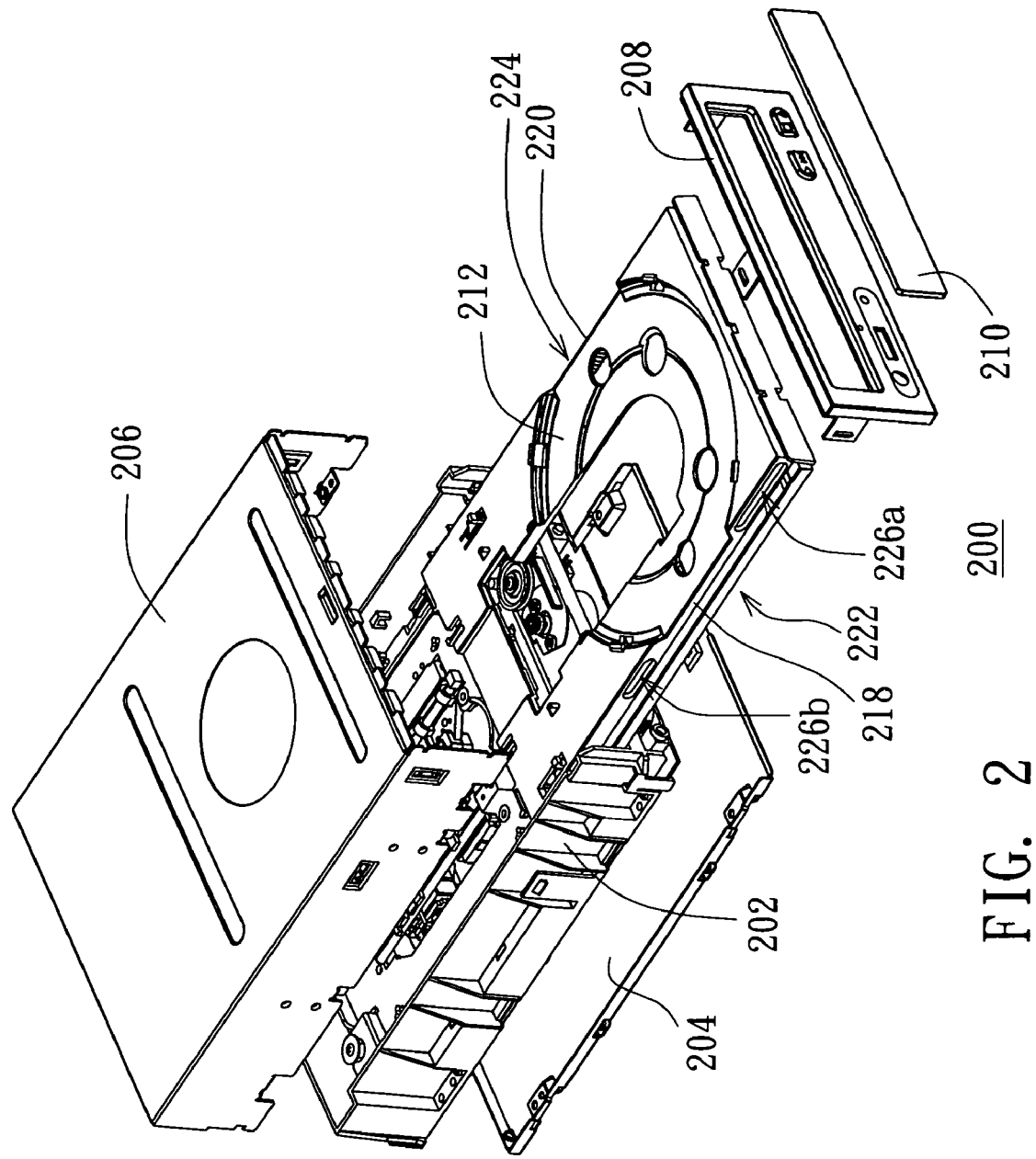
FIG. 2 is a diagram of the optical disc drive according to an embodiment of the invention.

Referring to FIG. 2, a diagram of the optical disc drive according to an embodiment of the invention is shown. The optical disc drive 200 includes a base 202, a lower cover 204, an upper cover 206, a face panel 208, a door panel 210 and a tray body 212.

The door panel 210 and the tray body 212 are coupled and assembled together to form a tray. The base 202, the lower cover 204, the upper cover 206 and the face panel 208 are coupled and assembled together to form an optical disc drive body. The tray is movably disposed on the optical disc drive body. In other word, the tray is capable of entering and leaving the optical disc drive body to be disposed on the optical disc drive body. The tray for carrying optical disc (not shown in the diagram) loads the optical disc into the optical disc drive body for the optical disc drive body to access.

The tray body 212 includes a first side wall 218 and a second side wall 220. The first side wall 218 is disposed on a first side 222 of the tray body 212. The first side wall 218 has two first through holes 226a and 226b.

Beside, the second side wall 220 is disposed on a second side 224 of the tray body 212. The second side 224 of the tray body 212 opposes to the first side 222 of the tray body 212. Moreover, the second side wall 220 has two second through holes respectively corresponding to the first through holes 226a and 226b (not shown in the diagram due to the view angle in the diagram).

Figures 3A, 3B:
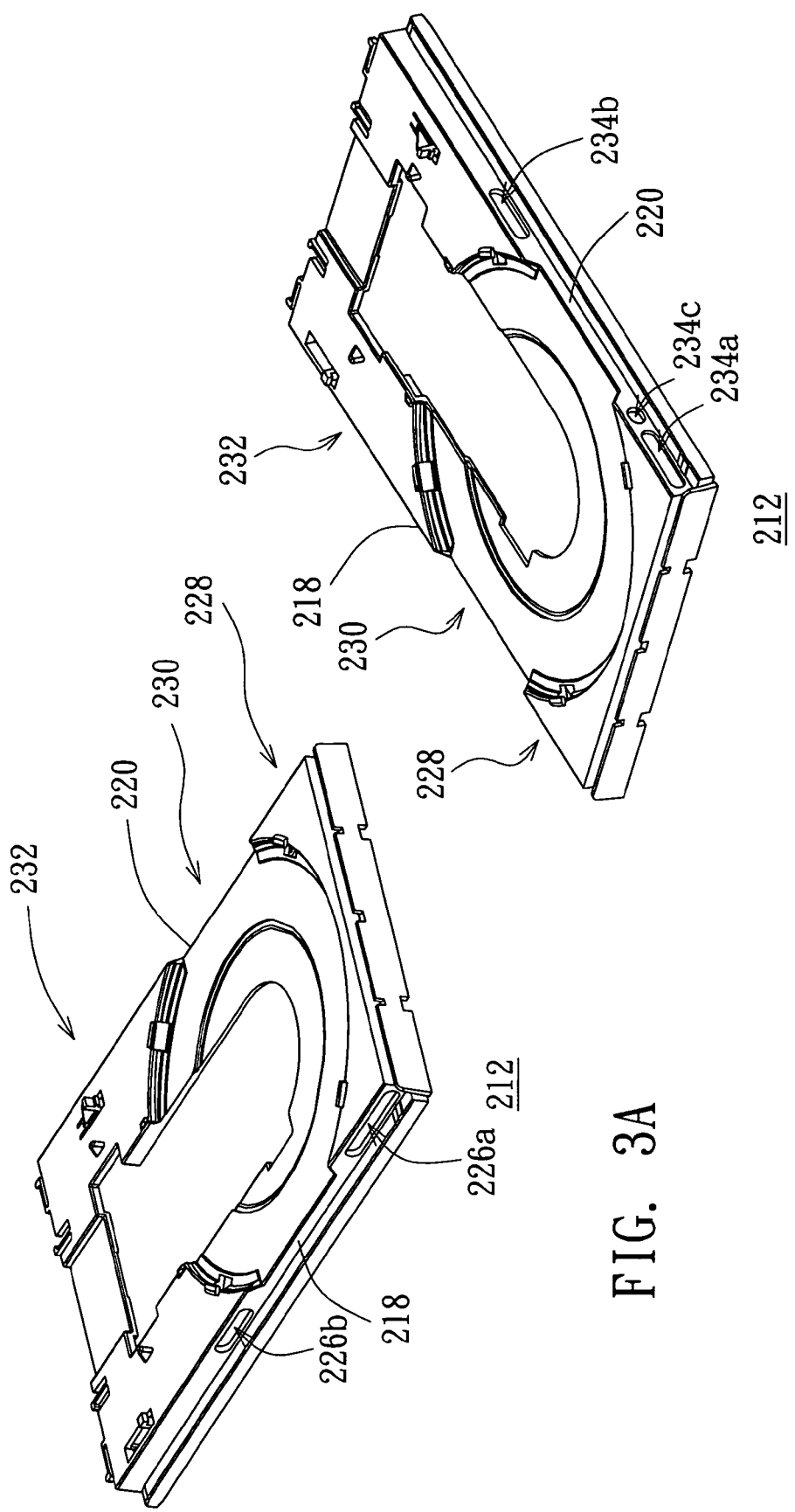
FIG. 3A is a diagram of the tray body of FIG. 2.
FIG. 3B is a diagram showing the tray body of FIG. 3A can further have a first through hole and a second through hole be disposed in the middle portion.

Referring to FIG. 3A and FIG. 3B, diagrams of the tray body 212 of FIG. 2 are shown. For the purpose of explanation, the tray body 212 of FIG. 2 is separated from the optical disc drive 200. The tray body 212 of the tray can carry the optical disc from the optical disc drive body and positions on a location. The tray body 212 can be roughly divided into a front portion 228, a middle portion 230 and a back portion 232 according to their distances with the optical disc drive body from the farthest to the nearest.

As shown FIG. 3A and FIG. 3B, both the first through hole 226a, which is positioned on the first side wall 218 of the tray body 212, and the second through hole 234a, which is positioned on the second side wall 220 of the tray body 212 and corresponding to the first through hole 226a, are positioned near the front portion 228 of the tray body 212. The shape and size of the second through hole 234a are substantially the same with that of the first through hole 226a.

Similarly, the first through hole 226b, which is positioned on the first side wall 218 of the tray body 212, and the second through hole 234b, which is positioned on the second side wall 220 of the tray body 212 and corresponding to the first through hole 226b, are positioned near the back portion 232 of the tray body 212. The shape and size of the second through hole 234b are substantially the same with that of the first through hole 226b.

Referring to FIG. 3B, a diagram showing the tray body 212 of FIG. 3A can further have a third through hole 234c be disposed on a position near the middle portion 230. The tray body 212 in FIG. 3B is viewed from another view angle and shows the second side wall 220 of the tray body 212 that can not be viewed in FIG. 3A.

Compared with the tray body illustrated in FIG. 3A, the tray body illustrated in FIG. 3B has a third through hole 234c near the middle portion 230 be disposed on the second side wall 220. The third through hole 234c does not have to correspond to the first through hole 226a or the first through hole 226b.

Figure 4A:
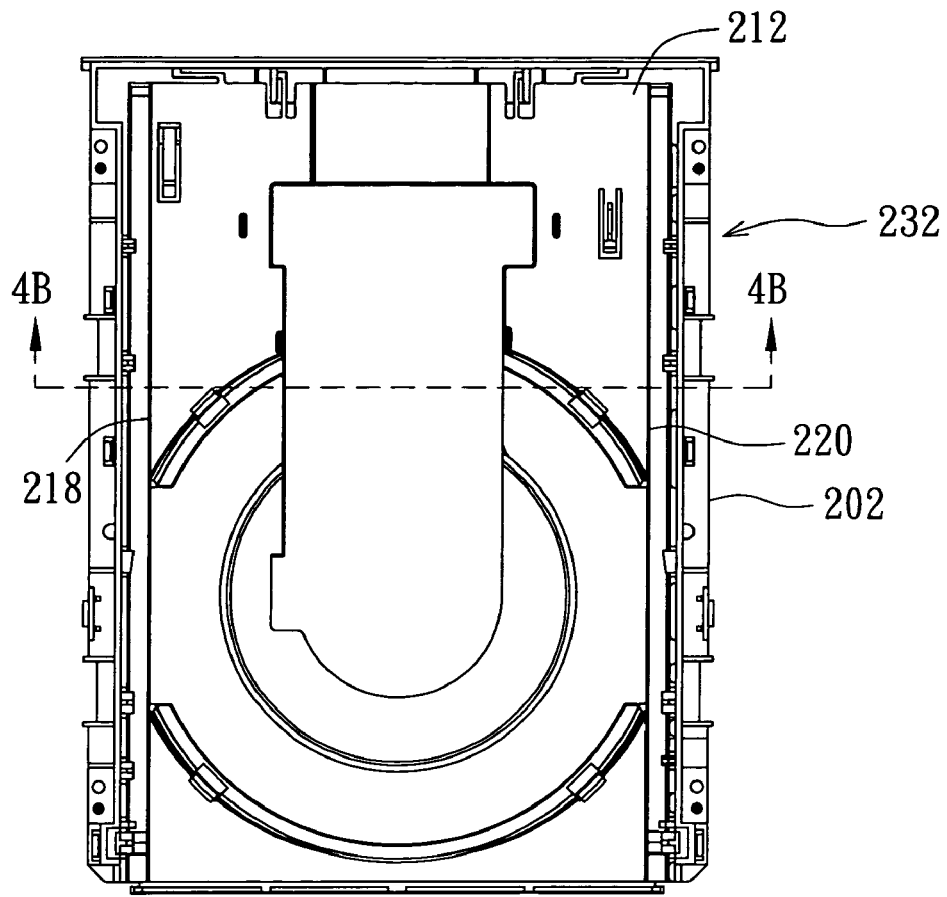
FIG. 4A is a top view of a base having a tray body.
Figure 4B:
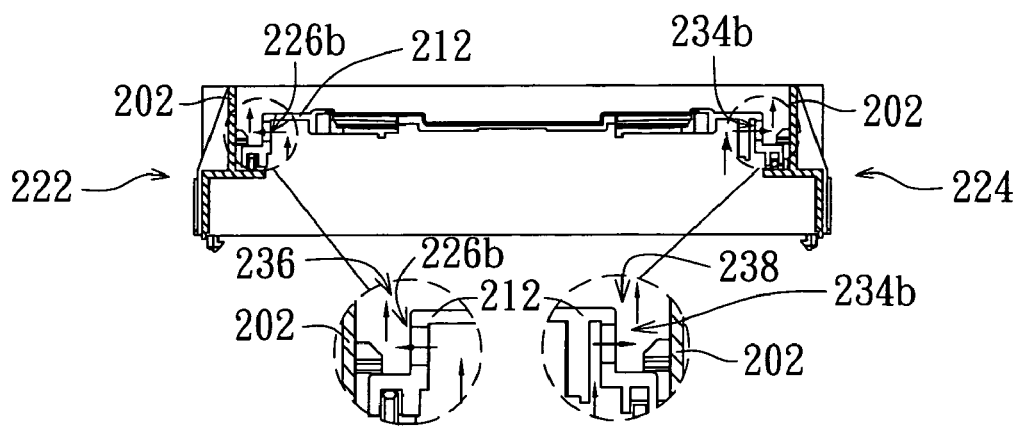
FIG. 4B is a cross-sectional view along the 4B-4B section of FIG. 4A.

Referring to both FIG. 4A and FIG. 4B, FIG. 4A is a top view of the base 202 having the tray body 212. FIG. 4B is a cross-sectional view along the 4B-4B section of FIG. 4A. The 4B-4B section in FIG. 4A extends from the first through hole 226b of the first side wall 218 to the second through hole 234b of the second side wall 220 near the back portion 232 of the tray body 212 (as shown in FIG. 3A and FIG. 3B).

The principles of reducing noise for the optical disc drive according to the invention is exemplified by the first through hole 226b, which is disposed on the first side wall 218, and the second through hole 234b, which is disposed on the second side wall 220 and corresponding to the first through hole 226b.

As shown in FIG. 4B, the flowing directions of the airflow generated due to the high speed rotation of the optical disc are shown in arrows. That is, the gas with pressure difference at various positions of the flow field, first of all, flows upward to the bottom of the tray body 212 from under the tray body 212. Next, the upward going gas turns into the first through hole 226b and the second through hole 234b. Then, the gas flowing from the first through hole 226b and the second through hole 234b would flow along the base 202 and then turn upwards due to the blockage of the base 202.

Figure 5B:
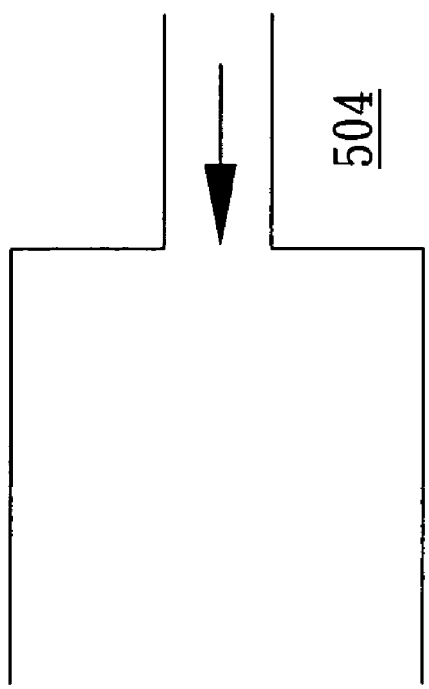
FIG. 5B is a diagram of a reactive muffler.
Figure 5A:
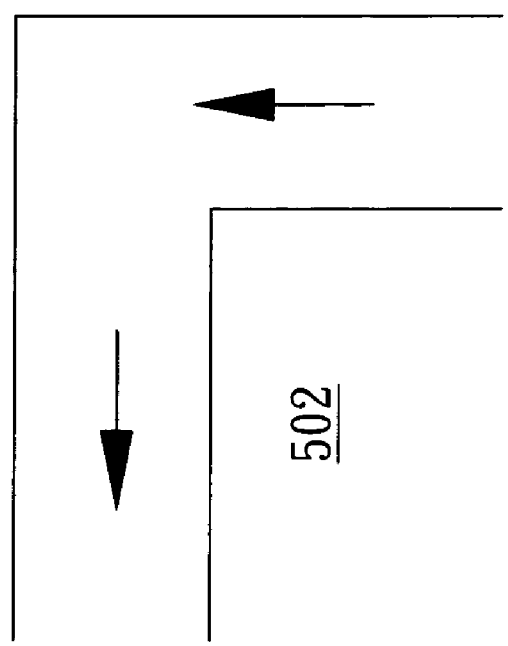
FIG. 5A is a diagram of a dissipative muffler.

Referring to FIG. 5A and FIG. 5B at the same time. FIG. 5A is a diagram of a dissipative muffler, while FIG. 5B is a diagram of a reactive muffler. The arrow directions shown in FIG. 5A and FIG. 5B respectively represent the flowing directions of the gas in the dissipative muffler 502 and the reactive muffler 504.

Referring to FIG. 4B, a partially enlarged view when the gas flows through the vicinity of the first through hole 226b. A first clearance 236 exists between the base 202 and the first side 222 of the tray body 212. A second clearance 238 exists between the base 202 and the second side 224 of tray body 212.

The airflow generated when the optical disc rotates can flow to the first side 222 and the second side 224 of the tray body 212 from the edge of the optical disc. Then, the airflow passes through the first through hole 226b and the second through hole 234b, and then deflects to flow through the first clearance 236 and the second clearance 238. The above disclosure shows how the fluid flows in the dissipative muffler 502 of FIG. 5A.

The dissipative muffler 502 has a bending. The gas suffers energy loss when passing through the bending, thus reducing the gas acoustic energy. Normally, the gas acoustic energy that the dissipative muffler 502 can reduce is proportional to the bending angle of the dissipative muffler 502.

Besides, referring to FIG. 5B, and again referring to FIG. 4B, a partially enlarged view when the gas flows through the vicinity of the first through hole 226b. The description how the gas passes the first through hole 226b belongs to that how the fluid flows in the reactive muffler 504 of FIG. 5B.

Compared with the dissipative muffler 502 of FIG. 5A, the reactive muffler 504 uses the change in the cross-section of the runner of the reactive muffler 504 to form the mismatching of acoustic impedance during acoustic transmission. Part of the acoustic energy is fed back towards the acoustic source, thus reducing the acoustic energy.

With the first through holes 226a and 226b, and the second through holes 234a and 234b and the third through hole 234c which are corresponding to the first through holes 226a and 226b, being disposed on the first side wall 218 and second side wall 220 of the tray body 212 respectively, the optical disc drive 200 according to the invention is equipped with both the function of reducing acoustic energy according to the dissipative muffler 502 and the function of reducing acoustic energy according to the reactive muffler 504.

In the above embodiment of the invention, the number of the first through hole and the second through hole respectively positioned on the first side wall 218 and the second side wall 220 of the tray body 212 is not limited to one or two or three. The first through hole and the second through hole of whatever number are within the scope of the technology of the invention. Moreover, the first through hole disposed on the first side wall 218 and the second through hole disposed on the second side wall 220 are within the scope of the technology of the invention regardless whether they correspond to each or whether the shape and size of the first through hole and the second through hole are substantially the same or not.

The optical disc drive 300 of the invention has the advantage of using both the dissipative muffler 502 and the reactive muffler 504 to reduce acoustic energy without adding any manufacturing costs.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical disc drive, comprising:
   a body; and
   a tray movably disposed on the body, wherein the tray has a tray body and a side wall, the tray body is for carrying an optical disc, the side wall is disposed on one side of the tray body and not parallel to the tray body, the side wall has a through hole;
   wherein the airflow generated when the optical disc rotates flows from the edge of the optical disc to the side wall along a direction substantially parallel to the tray body, passes through the through hole, and flows through a clearance between the side wall and the body, reducing the accoustic energy in the airflow.

2. The optical disc drive according to claim 1, wherein the tray further has a front portion, the through hole is adjacent to the front portion.

3. The optical disc drive according to claim 1, wherein the tray further has a middle portion, the through hole is adjacent to the middle portion.

4. The optical disc drive according to claim 1, wherein the tray further has a back portion, the through hole is adjacent to the back portion.

5. The optical disc drive according to claim 1, wherein the airflow is deflected by the body to flow through the clearance between the side wall and the body.

6. An optical disc drive, comprising:
   a body having a base; and
   a tray movably disposed on the body for carrying an optical disc, wherein the tray comprises:
   a tray body for carrying the optical disc;
   a first side wall disposed on a first side of the tray body and not parallel to the tray body, wherein the first side wall has at least a first through hole, a first clearance exists between the base and the first side; and
   a second side wall disposed on a second side of the tray body and not parallel to the tray body, wherein the second side opposes to the first side, the second side wall has at least a second through hole corresponding to the first through hole, a second clearance exists between the base and the second side;
   wherein the airflow generated when the optical disc rotates flows from the edge of the optical disc to the first side and the second side along directions substantially parallel to the tray body, passes through the first through hole and the second through hole, and flows through the first clearance and the second clearance, reducing the acoustic energy in the airflow.

7. The optical disc drive according to claim 6, wherein the tray further has a middle portion, the first through hole and the second through hole are adjacent to the middle portion.

8. The optical disc drive according to claim 6, wherein the tray further has a back portion, the first through hole and the second through hole are adjacent to the back portion.

9. The optical disc drive according to claim 6, wherein the second side wall further has a third through hole not corresponding to the first through hole.

10. The optical disc drive according to claim 6, wherein the tray further has a front portion, the first through hole and the second through hole are adjacent to the front portion.

11. The optical disc drive according to claim 6, wherein the airflow is deflected by the body to flow through the first clearance and the second clearance.

* * * * *